United States Patent
Flordal et al.

(10) Patent No.: US 9,612,949 B2
(45) Date of Patent: Apr. 4, 2017

(54) MEMORY ALLOCATION IN A MULTI-CORE PROCESSING SYSTEM BASED ON A THRESHOLD AMOUNT OF MEMORY

(71) Applicant: ARM Limited, Cambridge (GB)

(72) Inventors: Oskar Flordal, Lund (SE); Hakan Persson, Cambridge (GB); Andreas Engh-Halstvedt, Trondheim (NO)

(73) Assignee: ARM LIMITED, Cambridge (GB)

( * ) Notice: Subject to any disclaimer, the term of this patent is extended or adjusted under 35 U.S.C. 154(b) by 212 days.

(21) Appl. No.: 13/916,722

(22) Filed: Jun. 13, 2013

(65) Prior Publication Data
US 2014/0372722 A1 Dec. 18, 2014

(51) Int. Cl.
| | | |
|---|---|---|
| *G06F 12/00* | (2006.01) | |
| *G06F 12/02* | (2006.01) | |
| *G06F 9/50* | (2006.01) | |
| *G06T 1/60* | (2006.01) | |

(52) U.S. Cl.
CPC ............ *G06F 12/02* (2013.01); *G06F 9/5016* (2013.01); *G06F 12/0284* (2013.01); *G06T 1/60* (2013.01)

(58) Field of Classification Search
CPC .... G06F 3/0631; G06F 3/0644; G06F 3/0656; G06F 3/0683; G06F 12/0806
USPC ........ 711/153, 156, 163, 170; 710/6, 11, 28, 710/52, 56, 310; 713/502; 712/12, 36
See application file for complete search history.

(56) References Cited

U.S. PATENT DOCUMENTS

| | | | | |
|---|---|---|---|---|
| 7,519,796 | B1* | 4/2009 | Golla ................ | G06F 9/3814 712/225 |
| 2007/0076735 | A1* | 4/2007 | Soo ................... | G06F 13/385 370/412 |
| 2010/0023679 | A1* | 1/2010 | Blum ................ | 711/103 |
| 2010/0281221 | A1* | 11/2010 | Cantin .............. | G06F 12/0813 711/132 |
| 2010/0293353 | A1* | 11/2010 | Sonnier ............. | G06F 15/167 711/170 |
| 2010/0318637 | A1* | 12/2010 | Ly .................... | G06F 9/5083 709/221 |
| 2011/0219382 | A1* | 9/2011 | Hou .................. | G06F 9/50 718/104 |

(Continued)

OTHER PUBLICATIONS

Combined Search and Examination Report dated Dec. 16, 2014 in GB Application No. GB1410596.9, 5 pages.

*Primary Examiner* — Reba I Elmore
(74) *Attorney, Agent, or Firm* — Vierra Magen Marcus LLP

(57) ABSTRACT

A processing system comprises plural processing cores and a task allocator for allocating tasks to the processing cores. The processing cores perform the tasks that are allocated to them so as to produce results for the tasks, the results being stored by the processing cores in a buffer. The task allocator indicates to the processing cores memory portions within the buffer in which to store the results. When the processing cores determine that a given memory portion is becoming full, the processing cores request that the task allocator indicates a new memory portion in which to store its results. The processing system allows the task allocator to dynamically and efficiently allocate memory portions to plural processing cores without the task allocator 40 needing to know the sizes of the results being produced by the processing cores.

19 Claims, 6 Drawing Sheets

(56) References Cited

U.S. PATENT DOCUMENTS

| | | | |
|---|---|---|---|
| 2011/0314233 A1* | 12/2011 | Yan | G06F 17/30501 |
| | | | 711/154 |
| 2012/0144162 A1* | 6/2012 | Papakipos et al. | 712/200 |
| 2012/0262493 A1* | 10/2012 | Tsai | G06T 1/20 |
| | | | 345/667 |
| 2013/0058412 A1* | 3/2013 | Chen et al. | 375/240.13 |
| 2013/0238791 A1* | 9/2013 | Anderson et al. | 709/224 |
| 2014/0281657 A1* | 9/2014 | Wolfe | G06F 1/08 |
| | | | 713/501 |

* cited by examiner

MEMORY ALLOCATION IN A MULTI-CORE PROCESSING SYSTEM BASED ON A THRESHOLD AMOUNT OF MEMORY

BACKGROUND

The technology described herein relates to a method of and apparatus for allocating memory to processing cores in a multi-core, e.g. computer graphics, processing system.

As is known in the art, graphics processing is normally carried out by first dividing the output to be generated, such as a frame to be displayed, into a number of similar basic components (so called "primitives") to allow the graphics processing operations to be more easily carried out. These "primitives" are usually in the form of simple polygons, such as triangles.

The graphics primitives are usually generated by the applications program interface for the graphics processing system, using the graphics drawing instructions (requests) received from the application (e.g. game) that requires the graphics output.

Each primitive is at this stage usually defined by and represented as a set of vertices. Each vertex for a primitive has associated with it a set of data (such as position, colour, texture, and other attributes data) representing the vertex. This data is then used, e.g., when rasterising and rendering the vertex (the primitive(s) to which the vertex relates) in order to generate the desired output of the graphics processing system.

Once primitives and their vertices have been generated and defined, they can be processed by the graphics processing system, in order, e.g., to display the frame.

This process basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

(In graphics literature, the term "rasterisation" is sometimes used to mean both primitive conversion to sample positions and rendering. However, herein "rasterisation" will be used to refer to converting primitive data to sampling point addresses only.)

The rasterising process determines the sample positions that should be used for a primitive (i.e. the (x, y) positions of the sampling points to be used to represent the primitive in the output, e.g. scene to be displayed). This is typically done using the positions of the vertices of a primitive.

The rendering process then derives the data, such as red, green and blue (RGB) colour values and an "Alpha" (transparency) value, necessary to represent the primitive at the sampling points (i.e. "shades" each sampling point). This can involve, as is known in the art, applying textures, blending sampling point data values, applying depth tests etc. In some arrangements, the data which is derived as a result of the rendering process may be compressed and then output to main memory.

As is known in the art, in a multi-core graphics processing system, the time taken to carry out a graphics processing job (e.g. rendering, data compression, etc.) can be greatly reduced by dividing the scene to be processed into a number of task, and then allocating different ones of those tasks to different graphics processing cores for processing in parallel. Each task may, e.g., be a respective tile to be processing in a tile-based graphics processing system.

The different results produced by the different graphics processing tasks are typically stored in the same buffer as they are being produced, e.g. prior to being output together, and so a portion of a buffer is required for use by each of the graphics processing cores for storing the results produced as and when the results are produced by the cores.

In cases where the amount of buffered memory required by each graphics processing core to complete a given task is known in advance, it is relatively simple to allocate an amount of the buffer for use by each graphics processing core prior to the graphics processing task being carried out. For example, where there are four graphics processing cores, and it is known that each of the graphics processing cores will require the same amount of the buffer to stored its results, each core can be allocated a quarter of the buffer.

However, for some graphics processing tasks, the processing time for a task and/or the amount of memory required to store the result for a task can vary from task to task. This can lead to some graphics processing cores requiring less of the buffer to store their results than others (e.g. either because the results produced by that core require less storage space and/or because that core has processed fewer tasks). Generally, the data stored in the buffer should be stored as close together as possible, e.g. for efficient paging. Thus, for some graphics processing tasks, simply allocating each core a fraction of the buffer can lead to undesirable gaps in the data which is stored in the buffer.

The Applicants believe that there remains scope for improved arrangements for allocating memory to processing cores in a multi-core, e.g. computer graphics, processing system.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
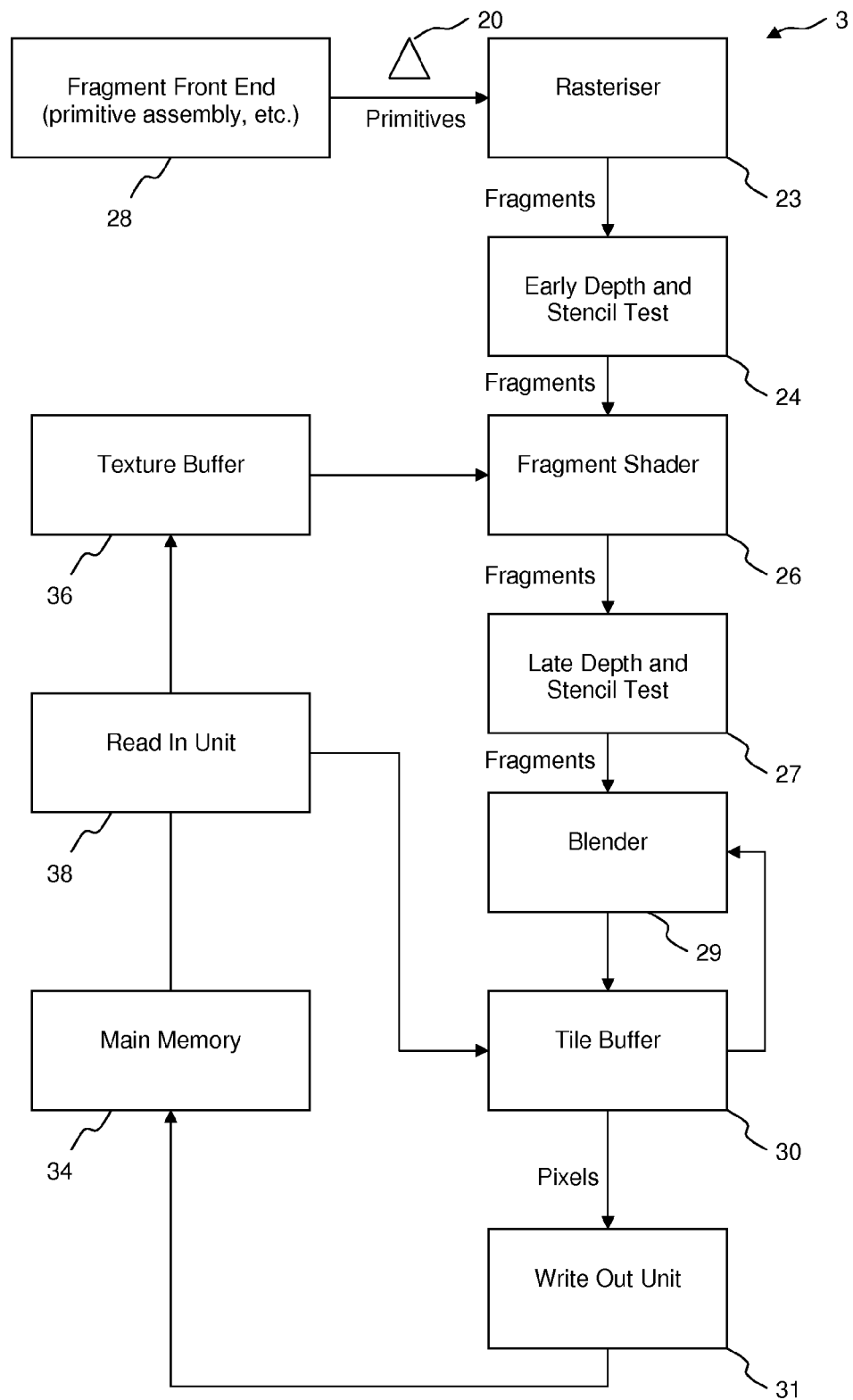
FIG. 1 shows schematically a graphics processing pipeline that can be operated in the manner of the technology described herein.

An embodiment of the technology described herein comprises a method of allocating memory to processing cores in a multi-core processing system, the system comprising: plural processing cores for performing processing tasks, each processing core processing each task allocated to that processing core to produce a result for that task;

a buffer comprising an allocated amount of memory for storing results that are produced by the plural processing cores; and a task allocator that allocates to the processing cores tasks to be processed, the task allocator indicating to the processing cores memory portions in the buffer for storing the results produced for the tasks;

the method comprising each processing core, when processing a particular task to be processed by that processing core:

processing the particular task to produce a particular result for the particular task;

storing the particular result in a particular memory portion of the allocated memory of the buffer indicated to the processing core by the task allocator;

determining whether there is less than a threshold amount of memory remaining in the particular memory portion; and if there is less than the threshold amount of memory remaining in the particular memory portion, indicating to the task allocator that a new memory portion for the processing core is required;

the method further comprising the task allocator, when a new memory portion is indicated as being required by a particular processing core:

indicating a new memory portion to the particular processing core.

Another embodiment of the technology described herein comprises a multi-core processing system comprising:

plural processing cores for performing processing tasks, each processing core processing each task allocated to that processing core to produce a result for that task;

a buffer comprising an allocated amount of memory for storing results that are produced by the plural processing cores; and a task allocator that allocates to the processing cores tasks to be processed, the task allocator indicating to the processing cores memory portions in the buffer for storing the results produced for the tasks;

each processing core being configured to, when processing a particular task to be processed by that processing core:

process the particular task to produce a particular result for the particular task;

store the particular result in a particular memory portion of the allocated memory of the buffer indicated to the processing core by the task allocator;

determine whether there is less than a threshold amount of memory remaining in the particular memory portion; and if there is less than the threshold amount of memory remaining in the particular memory portion, indicate to the task allocator that a new memory portion for the processing core is required;

the task allocator being configured to, when a new memory portion is indicated as being required by a particular processing core:

indicate a new memory portion to the particular processing core.

The technology described herein relates to a processing system that has plural processing cores. A task allocator allocates tasks (such as tiles to be processed) to each processing core. The processing cores store their task results (e.g. processed tiles) in portions of memory allocated to the respective cores. When the unused memory within a memory portion allocated to a core is getting low, the processing core indicates this to the task allocator, and the task allocator can then indicate a new memory portion to use for subsequent tasks to the processing core.

The technology described herein accordingly provides a way for allocating portions of a buffer to processing cores as and when additional memory is needed by the processing cores in use. This can then allow memory portions to be allocated to the processing cores dynamically as tasks are completed, rather than, e.g., simply having to initially allocate each core a fixed, and, e.g., worst-case, amount of memory. It can also ensure that the processed task data can be packed more efficiently in memory.

Furthermore, since it is the processing cores which indicate when a new memory portion is needed, the task allocator does not itself need, e.g., to keep track of the details (e.g. size) of the results which are being produced by the respective processing cores and determine when further memory may be required for a processing core. This can simplify the configuration and operation of the task allocator, whilst still facilitating the efficient allocation of memory portions to the processing cores dynamically in use.

The technology described herein is particularly advantageous when the processing cores are performing processing tasks in which the sizes of the results produced by the processing cores are not known in advance. One such task is a data compression task, such as frame buffer compression. In data compression tasks some sets of data may be compressed to a greater extent, whereas other sets of data may be compressed to a lesser extent.

The processing system of the technology described herein can take any desired and suitable form. However, in an embodiment, the processing system is a graphics processing system. Thus, the processing cores are in an embodiment graphics processing cores and the tasks performed by the processing cores are in an embodiment graphics processing tasks.

The tasks to be performed by the graphics processing cores can any suitable and desired graphics processing tasks. In an embodiment, each task comprises an identifiable and corresponding portion of an overall graphics processing job to be performed, such as of a frame to be rendered. In an embodiment, the graphics processing system is a tile-based system and each task is a tile to be processed, e.g. of a frame to be rendered. The task allocator is correspondingly in an embodiment a tile allocator.

For convenience, the following description will primarily be given with reference to the tasks being tiles to be processed, but it should be understood that the principles and features of the technology described herein can equally and correspondingly be applied to other forms of (e.g. graphics) processing task, if desired (and the technology described herein extends to other forms of (e.g. graphics) processing task).

Thus, in embodiments, the process which is performed by the graphics processing cores comprises a data compression operation for tiles of a graphics processing output to be generated, such as a frame, e.g. for display. Similarly, the result which is produced for each tile in an embodiment comprises a compressed representation of the tile being processed. The data compression can take any suitable or desired form. However, in an embodiment, the data compression is that which is described in US 2013/0034309, the disclosure of which is incorporated herein by reference in its entirety.

In an embodiment, the plural memory portions of the allocated memory are of the same predetermined size. The predetermined size for the memory portions is in an embodiment large enough to store a predetermined number of plural maximum or "worst case" results. The maximum or "worst case" result for data compression, for example, is the uncompressed data to be compressed. In one embodiment, the predetermined size for the memory portions is 16K, although other predetermined sizes may of course be used as desired. The processing cores are in an embodiment aware of the predetermined size for the memory portions (e.g. the predetermined size for the memory portions is stored in memory accessible to the processing cores), but the task allocator in an embodiment is not aware of the predetermined size for the memory portions.

Similarly, in an embodiment, the allocated memory in the buffer is of a predetermined size. In one embodiment, the predetermined size for the allocated memory is 232 bits, although other predetermined sizes may of course be used as desired. Again, the processing cores are in an embodiment aware of the predetermined size for the allocated memory (e.g. the predetermined size for the allocated memory is stored in memory accessible to the processing cores), but the task allocator in an embodiment is not aware of the predetermined size for the allocated memory.

The technology described herein can be applied to arrangements having any suitable and desired number of plural processing cores. However, in an embodiment, the processing system has (e.g. at least) four processing cores.

The task allocator can indicate memory portions to the processing cores in any desired and suitable way. However, in an embodiment, the task allocator provides a particular memory index to the processing core, in an embodiment when allocating a particular task (e.g. tile) to be processed to the particular processing core for processing. The particular processing core in an embodiment stores the particular result for the particular task (e.g. tile) in the particular memory portion based on the particular memory index. In an embodiment, as will be discussed below, the particular memory portion is at a location in the allocated memory of the buffer that is derived from the particular memory index.

In an embodiment, each processing core maintains its own memory index or indexes. In an embodiment, each processing core can maintain (only) a current memory index and a new memory index. In an embodiment, the task allocator provides a (e.g. new) memory index to the processing core with (only) the first task of plural tasks to be processed and stored using that (e.g. new) memory index. Conversely, the task allocator in an embodiment does not maintain memory indexes for the processing cores, e.g. once a (e.g. new) memory index is provided to a processing core, the task allocator in an embodiment does not retain that memory index in memory.

The memory indexes for the processing cores in an embodiment (always) have different values such that each core (always) uses a different portion of the buffer. This can, for example, prevent the cores from overwriting results produced by other cores.

The different values may be initialised (e.g. prior to a processing job (e.g. frame to be processed) commencing) in any desired and suitable way. In some embodiments, the memory indexes are initialised to different initial values that are consecutive values. The different initial values may start at zero and/or may be the processing core number. For example, where there are four processing cores (numbered 0-3), the different initial memory index values for the four cores may be 0, 1, 2 and 3.

In an embodiment, the task allocator comprises at least one counter, and the at least one counter is in an embodiment used to derive new indexes for the new memory portions. Thus, in an embodiment, the task allocator derives an indication to a new memory portion to be used by the particular processing core and indicates the new memory portion to the particular processing core.

This may be done in any desired and suitable way. However, in embodiments, a new index value is the current counter value (i.e. the counter value prior to being incremented). The counter is in an embodiment incremented after it has been used to derive the new index. The counter can then be used, for example, to later derive further new indexes for further new memory portions.

The counter value may be initialised (e.g. prior to a processing job (e.g. frame to be processed) commencing) in any desired and suitable way. In some embodiments, the counter is initiated to a different value to (e.g. to a higher value than) the memory indexes. The initial counter value is in an embodiment the number of processing cores. For example, where there are four processing cores, the initial counter value may be 4.

The initial values for the memory indexes and/or counter are in an embodiment stored in memory accessible to the task allocator and/or processing cores, and are in an embodiment provided to the task allocator and/or processing cores prior to a processing job commencing or as the processing job is being commenced.

The technology described herein can be applied where the processing job is being performed in respect of only one output buffer (e.g. render target in a graphics processing system). However, the processing job is in an embodiment performed in respect of plural output buffers or render targets. In an embodiment, there are 9 output buffers or render targets.

In embodiments in which there are plural output buffers or render targets, the task allocator in an embodiment maintains a separate counter for each of the plural output buffers or render targets. For example, where there are 9 output buffers or render targets, the task allocator in an embodiment comprises 9 counters.

Similarly, in embodiments in which there are plural output buffers or render targets, each processing core in an embodiment separately maintains at least one memory index for each of the plural output buffers or render targets. In an embodiment, each processing core can separately maintain (only) a current memory index and a new memory index for each of the plural output buffers or render targets.

In embodiments, the results for the output buffers or render targets are processed and stored by the processing cores substantially independently of one another. Thus, the memory indexes for the processing cores (although in an embodiment different to one another for each given output buffer or render target) may at some points in time be the same value for different output buffers or render targets. Similarly, the counters may at some points in time take the same value for different output buffers or render targets.

The task allocator may indicate a particular task to be processed in any desired and suitable way. However, in an embodiment where the tasks are tiles to be processed, the particular tile to be processed is in an embodiment indicated by an address to the location of (e.g. a corner of) the tile in memory. The address in an embodiment comprises an x value and a y value. In an embodiment, the x value is represented by a first number of bits and/or the y value is represented by a second number of bits. The number of bits is in an embodiment the same number for each x value and/or each y value, and is for example 16 bits.

Similarly, the task allocator may provide a particular memory index in any desired and suitable way. However, in an embodiment, the particular memory index is in an embodiment provided by a number of bits, in an embodiment the same number of bits for each memory index. The number of bits is in an embodiment sufficient to provide enough indexes for a predetermined number of plural memory portions of a predetermined size within the buffer. In an embodiment, the number of bits is 20. This is sufficient, for example, to index memory portions which are each 16K in size in a 232 bit buffer.

In embodiments in which there are plural output buffers or render targets, the task allocator in an embodiment also indicates which of the output buffers or render targets the particular task (e.g. tile) to be processed and/or particular memory index is for. This indication can take any desired and suitable form. However, in an embodiment, the indication is provided by a number of bits equal to the number of output buffers or render targets (e.g. by a bitmap for the output buffers or render targets). For example, where there are 9 output buffers or render targets, 9 bits may be provided to indicate which of the output buffers or render targets the task and/or particular memory index is for. In embodiments, each bit corresponds to a different one of the output buffers or render targets and in an embodiment is set (e.g. to 1) if the particular task and/or particular memory index is for the output buffer or render target corresponding to that bit. In an embodiment, if some or all of the bits are set (e.g. to 1), then the memory indexes for the corresponding output buffers or render targets are updated to the particular memory index for the processing core in question.

In an embodiment, the indications are sent by the task allocator as part of a RUN command to the processing core, the RUN command being a command that instructs a particular processing core to carry out a particular processing task.

As discussed above, in embodiments, the processing cores store the results in a particular memory portion that is at a location in the buffer that is derived from the particular memory index. The location can be derived in any desired any suitable way. However, in an embodiment, the processing core determines an address from the memory index. In an embodiment, the processing core determines an address A by multiplying the memory index I by a predetermined size for the memory portions S and/or by adding an offset O, in an embodiment such that: $A=O+(I\times S)$. In embodiments in which there are multiple output buffers or render targets, the offset O may be a different value for each of the output buffers or render targets.

In the technology described herein, once the particular task (e.g. tile) is processed and the result is stored in the particular memory portion of the buffer, the processing core determines whether there is less than a threshold amount of unused memory remaining in the particular memory portion that the processing core is currently using to store its task (e.g. tile) results. If there is less than the threshold amount, the processing core requests a further memory allocation from the task allocator.

The threshold amount of memory that is used for this purpose can be selected as desired, but in an embodiment is based on an amount of memory that the processing core expects to have to use before it can receive a new memory allocation from the task allocator. In an embodiment, this amount is based on the number of tasks (e.g. tiles) the processing core will have to process before it can receive a new memory allocation, and an estimate of how much memory each such task (e.g. tile) will require.

The number of tasks (e.g. tiles) that the processing core will have to process before it can receive a new memory allocation can be determined as desired, but in an embodiment is based on, and in an embodiment includes, the number of tasks (e.g. tiles) that the processing core currently has to process (i.e. the number of tasks currently "in flight" for the core (tasks which have already been allocated to the processing core but which have not yet been processed by the processing core). This in an embodiment comprises both tasks that the core has already received for processing and tasks that have been dispatched or allocated to it by the task allocator, but not yet received.

As well as the number of tasks "in flight", the number of tasks (e.g. tiles) that the processing core will have to process before it can receive a new memory allocation is in an embodiment also based on, and in an embodiment also includes, the number of tasks (e.g. tiles) that could be dispatched to the processing core due to any latency or delay between the processing core sending the indication that it needs more memory and the processing core then receiving a new memory allocation from the task allocator (i.e. effectively the latency between the processing core realising it could run out of memory space and receiving an allocation of new memory space). Thus, the number of tasks (e.g. tiles) that the processing core will have to process before it can receive a new memory allocation in an embodiment also includes tasks which have not yet been allocated to the processing core but which could be allocated to the processing core by the task allocator during such delay (due to such latency). Such latency could include, e.g., the message round trip time, and also any delay in the task allocator between receiving the request from the processing core and being able to respond to that request.

In an embodiment, the number of tasks that such latency could cause is predetermined (e.g. based on know properties of the system and/or bench mark tests, etc.). In one embodiment, the delay is long enough for 3 subsequent tasks (e.g. tiles) to be allocated to a processing core with the current (not new) memory portion.

In one embodiment in which there are multiple output buffers or render targets, the task allocator can any provide a new memory portion to one output buffer or render target at a time, and so there may be an additional delay whilst new memory portions for other output buffers or render targets are provided. In embodiments, the "worst case" additional delay (in tiles) is given by the number of output buffers or render targets minus one. In one embodiment, there are 9 output buffers or render targets, and so there is an additional delay during which up to 8 tiles may be allocated to a processing core before a new memory index can be provided to that core.

The amount of memory that each task could require can be estimated as desired for this purpose. In an embodiment each task is assumed to require the same, in an embodiment predetermined, amount of memory. The estimated amount of memory for a task is in an embodiment based on, and in an embodiment corresponds to, the maximum (the worst case) amount of memory that a task could require (use). Thus, where each task is a tile to be compressed, the amount of memory for each task for the threshold test is in an embodiment set as the amount of memory that an uncompressed tile would occupy (as that is the worst case result for a tile). Then, by multiplying the amount of memory for each task by the number of outstanding tasks, a worst-case estimate of how much memory the processing core needs to complete its existing and know and expected future tasks can be derived. If this is then compared to the remaining space in the core's allocated memory portion, the core can determine if it is reaching a point where it could need more memory or not (and then indicate that to the task allocator accordingly).

The amount of unused memory remaining can be determined in any desired and suitable way. However, the amount of unused memory remaining is in an embodiment determined by the processing core from the predetermined size of the portion of the buffer and the total amount of memory in that portion already used by the processing core to store results for previous tasks (e.g. tiles). Thus, in an embodiment, the processing core (and in an embodiment only the processing core) monitors the total amount of memory in the particular portion already used by the processing core to store results for previous tasks (tiles).

The determination of whether there is less than a threshold amount of memory could comprise determining whether the unused memory is greater than the amount of memory that the processing core expects to have to use for its existing ("in flight") and expected tasks, e.g., including some form of selected, in an embodiment predetermined, margin. However, in an embodiment, the processing core compares the amount of unused memory to the amount of memory that it expects to have to use for its existing ("in flight") and expected tasks and if the difference is less than a threshold, requests a new memory allocation. In this case, the threshold will effectively be a margin of unused memory that if the core is going to fall below, triggers a new memory allocation.

In these arrangements, the amount of unused memory, expected memory, threshold, etc., may be expressed and measured and stored in the form of memory size (e.g. a number of bits, bytes, etc.) but in an embodiment are expressed and considered in terms of the number of tasks (e.g. tiles) that the memory amounts correspond to. This is in an embodiment based, as discussed above, on "worst case" memory usage for the tasks in question. Thus, for example, the amount of unused memory is in an embodiment considered in the form of the number of maximum or "worst case" task results which can be stored (thus, as discussed above, where the graphics processing task is tile data compression, as a number of uncompressed tiles). Similarly, the delay (latency) is in an embodiment expressed in terms of the number of tasks that could be allocated to the processing core during the delay.

Thus, in an embodiment, if the difference between the amount of unused memory in the particular memory portion (either in terms of memory size or tasks) and the amount of memory needed to store the subsequent results for the subsequent tasks (either in terms of memory size or tasks) is less than the threshold (either in terms of memory size or tasks), then the processing core in an embodiment requests a new memory portion. In one embodiment, the threshold is 1 task, although other thresholds or "margins" may of course be used as desired.

Thus, in an embodiment where each task is a tile to be processed, the graphics processing core will determine the number of "worst case" tiles (e.g. uncompressed tiles) that the amount of memory remaining in the memory portion can store, and subtract from that number of tiles the number of tiles already issued to the graphics processing core for processing but which have not yet been processed, and the number of tiles which could be issued to the graphics processing core before a new memory allocation is received by the graphics processing core (this is in an embodiment a fixed number, e.g. 3 tiles). The result of this calculation is then compared to a threshold number of tiles. If it is less than the threshold number of tiles, then the graphics processing core requests a new memory portion. The threshold may, e.g., be 1 tile.

The processing cores can indicate when a new memory portion is needed in any suitable and desired manner. In an embodiment, the indication is sent by the processing core as part of a DONE response to the task allocator, the DONE response being a response which indicates that the processing core has completed the processing of a particular task.

The indication that a new memory portion is required (e.g. in the DONE response) can take any desired and suitable form. However, in an embodiment, the processing core indicates that a new memory portion is needed by setting a bit in the DONE response (e.g. to 1).

In embodiments in which there are plural output buffers or render targets, the task allocator in an embodiment also indicates which of the output buffers or render targets the new memory portion is needed for. Again, this indication can take any desired and suitable form. However, in an embodiment, the indication (e.g. in the DONE command) is provided by a number of bits equal to the number of output buffers or render targets (e.g. by a bitmap for the output buffers or render targets). For example, where there are 9 output buffers or render targets, 9 bits may be provided to indicate which of the output buffers or render targets the new memory portion is needed for. Each bit in an embodiment corresponds to a different one of the output buffers or render targets and in an embodiment is set (e.g. to 1) if the new memory portion is needed for the output buffer or render target corresponding to that bit.

As discussed above, in embodiments, each processing core can keep track of only two indexes (per output buffer or render target where there are plural output buffers or render targets). In these embodiments, the task allocator in an embodiment only indicates a task for processing with a new index to each processing core once a DONE response is received for the current (not new) index for the processing core in question. This can ensure, for example, that all task using previous memory indexes are completed and that only two indexes (the current index and the new index) will be used by the processing core.

A processing core in an embodiment continues to use the current memory portion (e.g. indicated by the current memory index) for storing any subsequent results for subsequent tasks which have already been issued to the processing core for processing before it receives a new memory portion allocation.

Also, each processing core in an embodiment determines whether or not there is actually enough unused memory in the current memory portion for storing (e.g. worst case) results of tasks which have been issued to the processing core after it receives a new memory portion allocation. If a processing core determines that there is actually enough unused memory in the current memory portion for storing a (e.g. "worst case") result for a task which has been issued to the processing core after it received the new memory portion allocation, the processing core in an embodiment still uses the current memory portion for that task. This may be the case, for example, where the sizes of subsequent results which were already issued to the processing core for processing before it received the new memory portion turn out to be significantly smaller than they would have been in the "worst case". Thus, in embodiments, each processing core only uses the new memory portion allocation once it is determined that there is insufficient memory remaining to store a (e.g. worst case) result in the current memory portion.

Once the processing job is completed (e.g. all processing for all tiles has been completed), the results stored in the buffer are in an embodiment exported to main memory. In embodiments in which the processing job is data compression, the exported results may later be read from the main memory and decompressed, e.g. for use in other functions of the (graphics) processing system such as shading, blending, etc.

In embodiments, if the processing job is suspended before completion (e.g. prior to all processing tasks (e.g. all tiles)

being completed), the counter value is stored as a restart value (where there are plural output buffers or render targets, the counter value for each output buffer or render target may be stored as a respective restart value or the largest counter value for the plural output buffers or render targets may be stored as a restart value). The restart value (or respective restart values) can then be used, e.g. added (respectively) to the initial indexes and initial counter values discussed above, to give restart indexes and restart counter values for use when the processing job recommences. This can, for example, avoid previously generated results being overwritten when the processing job recommences.

Each processing core can have any other functions that a graphics processing core would normally have such as one or more of: a rasterising stage, an early depth (Z) stage, a fragment shading stage, a late depth (Z) test stage, a blending stage, etc. Subject to any hardware necessary to carry out the specific functions discussed above, such a graphics processing core can otherwise include any one or more or all of the usual functional units, etc., that graphics processing cores include.

The technology described herein can be used for all suitable forms of input and output that a graphics processing pipeline may be used to process and/or generate, such as frames for display, render to texture outputs, etc.

In some embodiments, the processing system, and/or each processing core, comprises, and/or is in communication with, one or more memories and/or memory devices that store the data described herein, such as the compressed colour data, etc., and/or store software for performing the processes described herein. The processing system and/or cores may also be in communication with a host microprocessor, and/or with a display for displaying images based on the data generated by the processing cores.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements of the technology described herein may comprise a suitable processor or processors, controller or controllers, functional units, circuitry, processing logic, microprocessor arrangements, etc., that are operable to perform the various functions, etc., such as appropriately configured dedicated hardware elements or processing circuitry, and/or programmable hardware elements or processing circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, if desired.

The technology described herein is applicable to any form or configuration of graphics processing core and to all forms of rendering, such as immediate mode rendering, deferred mode rendering, tile based rendering, etc. It is particularly applicable to graphics processing systems that use deferred mode rendering and in particular to tile-based graphics processing systems. Thus, in an embodiment the graphics processing system is a tile-based graphics processing system, and each graphics processing core is a tile-based graphics processing core.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. Thus embodiments of the technology described herein comprise computer software specifically adapted to carry out the methods herein described when installed on a data processor, a computer program element comprising computer software code portions for performing the methods herein described when the program element is run on a data processor, and a computer program comprising software code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, RAM, flash memory, CD ROM or disk.

It will further be appreciated that not all steps of the methods of the technology described herein need be carried out by computer software and embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible medium, such as a non transitory computer readable medium, for example, diskette, CD ROM, ROM, RAM, flash memory or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of embodiments of the technology described herein will now be described.

FIG. 1 shows a graphics processor 3 according to one embodiment of the technology described herein. The graphics processor 3 shown in FIG. 1 is a tile based graphics processing pipeline and will thus, as is known in the art, produce tiles of a render output data array, such as an output frame to be generated.

As is known in the art, in tile based rendering, rather than the entire render output, e.g., frame, effectively being processed in one go as in immediate mode rendering, the render output, e.g., frame to be displayed, is divided into a plurality of smaller sub regions, usually referred to as "tiles". Each tile (sub region) is rendered separately (typically one after another), and the rendered tiles (sub regions) are then recombined to provide the complete render output, e.g., frame for display. In such arrangements, the render output is typically divided into regularly sized and shaped sub regions (tiles) (which are usually, e.g., squares or rectangles), but this is not essential.

The render output data array may, as is known in the art, typically be an output frame intended for display on a display device, such as a screen or printer, but may also, for example, comprise intermediate data intended for use in later rendering passes (also known as a "render to texture" output), etc.

FIG. 1 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processing pipeline as shown in FIG. 1 may be implemented as desired and will accordingly comprise, e.g., appropriate circuitry and/or processing logic, etc., for performing the necessary operation and functions.

FIG. 1 shows schematically the pipeline stages after the graphics primitives (polygons) 20 for input to the rasterisation process have been generated. Thus, at this point the graphics data (the vertex data) has undergone fragment frontend operations 28, such as transformation and lighting operations (not shown), and a primitive set up stage (not shown) to set up the primitives to be rendered, in response to the commands and vertex data provided to the graphics processor, as is known in the art.

As shown in FIG. 1, this part of the graphics processing pipeline 3 includes a number of stages, including a rasterisation stage 23, an early Z (depth) and stencil test stage 24, a fragment shading stage 26, a late Z (depth) and stencil test stage 27, a blending stage 29, a tile buffer 30 and a downsampling and write out (multisample resolve) stage 31.

The rasterisation stage 23 of the graphics processing pipeline 3 operates, as is known in the art, to rasterise the primitives making up the render output (e.g. the image to be displayed) into individual graphics fragments for processing. To do this, the rasteriser 23 receives graphics primitives 20 for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 24 performs, is known in the art, a Z (depth) test on fragments it receives from the rasteriser 23, to see if any fragments can be discarded (culled) at this stage. To do this, it compares the depth values of (associated with) fragments issuing from the rasteriser 23 with the depth values of fragments that have already been rendered (these depth values are stored in a depth (Z) buffer that is stored in the tile buffer 30) to determine whether the new fragments will be occluded by fragments that have already been rendered (or not). At the same time, an early stencil test is carried out.

Fragments that pass the fragment early Z and stencil test stage 24 are then sent to the fragment shading stage 26. The fragment shading stage 26 performs the appropriate fragment processing operations on the fragments that pass the early Z and stencil tests, so as to process the fragments to generate the appropriate rendered fragment data, as is known in the art.

This fragment processing may include any suitable and desired fragment shading processes, such as executing fragment shader programs on the fragments, applying textures to the fragments, applying fogging or other operations to the fragments, etc., to generate the appropriate fragment data, as is known in the art. The textures may be stored in external memory 34, and may be read from the external memory 34 into a texture buffer 36 that is accessible to the fragment shader 26. In the present embodiment, the fragment shading stage 26 is in the form of a shader pipeline (a programmable fragment shader), but other arrangements, such as the use also or instead of fixed function fragment shading units would be possible, if desired.

There is then a "late" fragment Z and stencil test stage 27, which carries out, inter alia, an end of pipeline depth test on the shaded fragments to determine whether a rendered fragment will actually be seen in the final image. This depth test uses the Z buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 26 with the depth values of fragments that have already been rendered (as stored in the depth buffer). This late fragment depth and stencil test stage 27 also carries out any necessary "late" alpha and/or stencil tests on the fragments.

The fragments that pass the late fragment test stage 27 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to a colour buffer in the tile buffer 30 from where they can, for example, be output to a frame buffer for display. The depth value for an output fragment is also written appropriately to a Z buffer within the tile buffer 30. (The colour buffer and Z buffer will store, as is known in the art, an appropriate colour, etc., or Z value, respectively, for each sampling point that the buffers represent (in essence for each sampling point of a tile that is being processed).) The colour buffer and Z-buffer store, as is known in the art, an array of fragment data that represents part of the render output (e.g. image to be displayed).

In the present embodiment, the tile buffer 30 comprises an allocated portion of RAM that is located on (local to) the graphics processing pipeline (on-chip).

The, e.g. colour, data from the tile buffer 30 is input to a write out unit 31, and thence output (written back) to an output buffer, such as a frame buffer of a display device (not shown). (The display device could comprise, e.g., a display comprising an array of pixels, such as a computer monitor or a printer.)

Once a tile of the render output has been processed and its data exported to external memory (e.g. to a frame buffer (not shown) in the main memory 34) for storage, the next tile is then processed, and so on, until sufficient tiles have been processed to generate the entire render output (e.g. frame (image) to be displayed).

Other arrangements for the graphics processing pipeline 3 would, of course, be possible.

The above describes certain features of the operation of the graphics processing system shown in FIG. 1. Further features of the operation of the graphics processing system shown in FIG. 1 in accordance with embodiments of the technology described herein will now be described.

FIGS. 2-5 show a graphics processing system of an embodiment of the technology described herein in various states. The graphics processing system comprises a tile allocator 40 that allocates tiles to plural graphics processing cores 44, 46, 48, 50. Each graphics processing core stores the results of its processing in a shared memory buffer 52, such as a frame buffer, that may, e.g., be in the main memory 34. The tile allocator 40 comprises a counter 42 which, as will be discussed in more detail below, is used to derive indexes into the memory buffer 52 for each processing core.

Each of the graphics processing cores 44, 46, 48, 50 in this embodiment is a graphics processing pipeline 3 as shown in FIG. 1. The graphics processing cores 44, 46, 48, 50 process tiles which are allocated to them by the tile allocator 40, i.e. the graphics processing cores 44, 46, 48, 50 perform graphics processing on tiles in order to produce results for a graphics processing job. Thus, in this embodiment, the task performed by each graphics processing core comprises processing a tile, and the task allocator is the tile allocator 40.

In this embodiment, the graphics processing system is used to compress tile data, and so the graphics processing which is carried out by the graphics processing cores 44, 46, 48, 50 on each tile is data compression. The data compression scheme which is used to perform the data compression in this embodiment is that which is described in US 2013/0034309, the disclosure of which is incorporated herein by reference in its entirety.

The various results produced by the graphics processing cores 44, 46, 48, 50 are stored in the memory buffer 52. The buffer 52 in this embodiment is 232 bits in size, and is divided into 16K sized memory portions 54.

Figure 2:
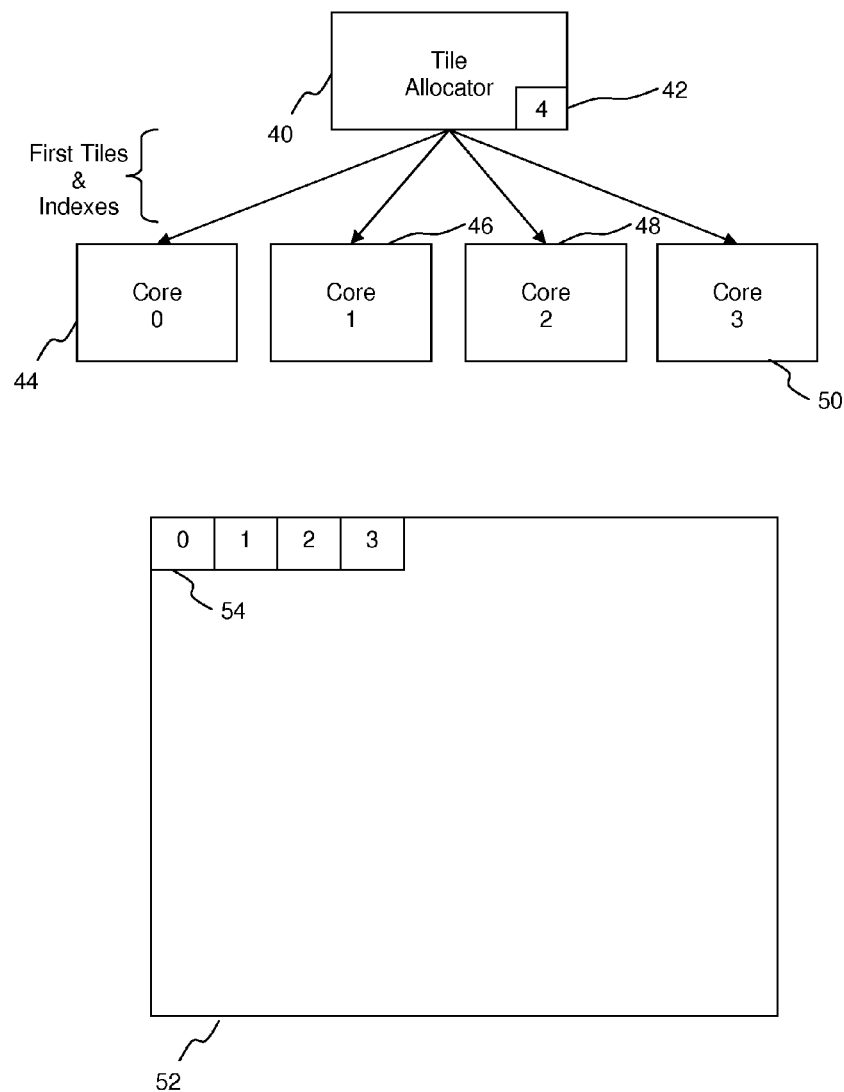
FIG. 2 shows an initial state for a graphics processing system according to one embodiment of the technology described herein.

FIG. 2 shows the graphics processing system in an initial state. In the initial state, the graphics processing cores 44, 46, 48, 50 are issued with memory indexes that correspond to their core number by the tile allocator 40. Thus, core 0 is issued with memory index 0, core 1 is issued with memory index 1, core 2 is issued with memory index 2, and core 3 is issued with memory index 3. The counter 42 is also set to the same value as the number of cores in the system, i.e. is set to 4.

The tile allocator 40 also indicates to each of the graphics processing cores 44, 46, 48, 50 a first tile to be processed. In this embodiment, each tile is indicated to a graphics processing core in a RUN command which comprises a 16 bit x address and a 16 bit y address for the tile to be processed. The RUN command also comprises the memory index for the graphics processing core to which the tile is allocated. In this embodiment, each memory index is indicated by a 20 bit number. The graphics processing system then transitions to a normal operating state.

Figure 3:
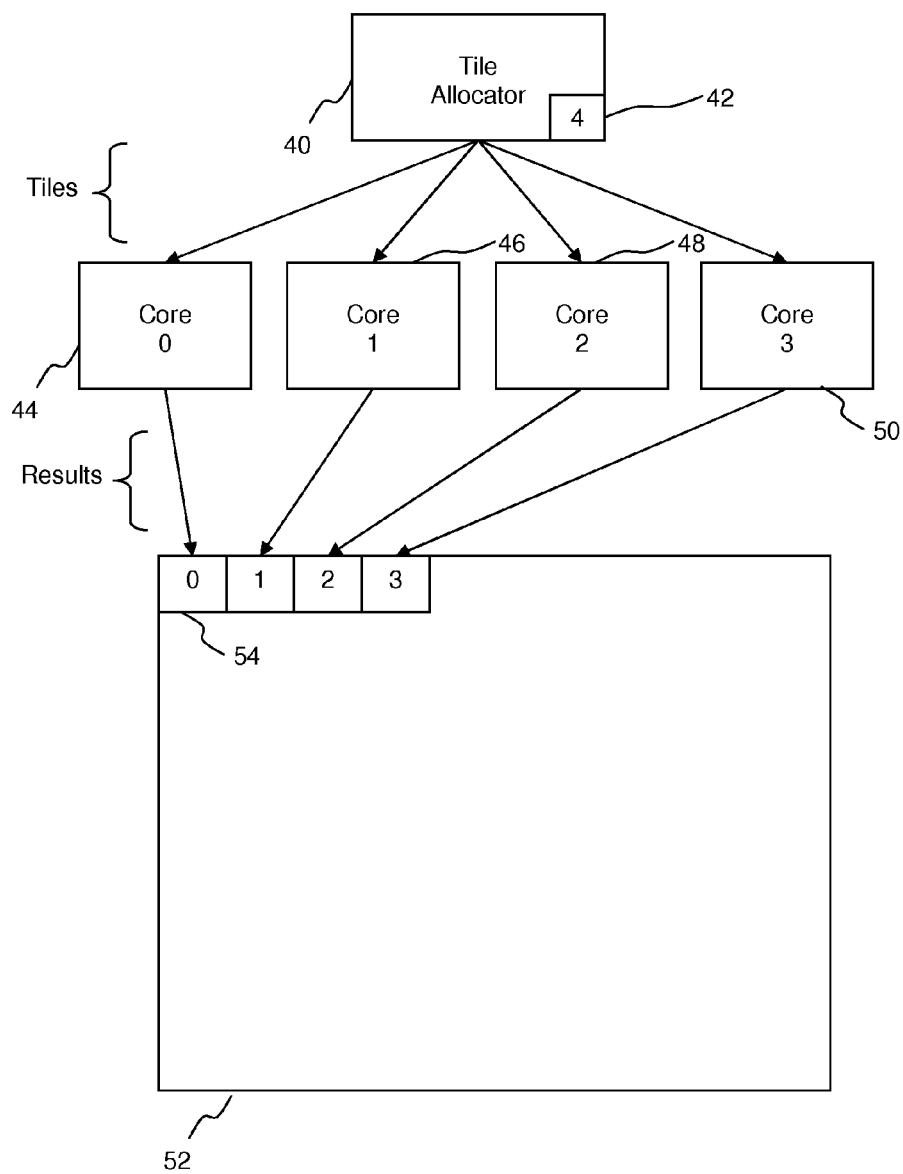
FIG. 3 shows a normal state for the graphics processing system of FIG. 2.

FIG. 3 shows the graphics processing system in the normal operating state. In this state, each graphics processing core 44, 46, 48, 50 uses the x and y addresses to access any tiles allocated to it. The graphics processing cores 44, 46, 48, 50 then compresses the tiles to produce results in the form of compressed tile data. The graphics processing cores 44, 46, 48, 50 then store the results in a memory portion 54 of the buffer 52.

The location of the memory portion 54 which is used to store each result for each tile is derived by each graphics processing core 44, 46, 48, 50 from the memory index that is issued to the graphics processing core 44, 46, 48, 50. In this embodiment, an address A of the location is derived by multiplying a memory index I (e.g. 1 for core 1) by the size S of the memory portions (16K) and by adding a memory offset O, such that: $A=O+(I \times S)$. Once each tile is processed and the result is stored, each graphics processing core 44, 46, 48, 50 sends a DONE response to the tile allocator 40.

Each graphics processing core 44, 46, 48, 50 continues to produce and store tile results (which will be of varying size) in this way until one of the graphics processing cores 44, 46, 48, 50 determines that, having stored the result for the latest tile to be processed, there is now less than a threshold amount of memory remaining in the memory portion which corresponds to the current index for the graphics processing core.

In this embodiment, this is achieved by determining the number of "worst case" tiles (in this case, therefore, uncompressed tiles) that the amount of memory remaining in the memory portion can store, and subtracting from that number of tiles already issued to the graphics processing core for processing but which have not yet been processed, and the number of tiles which could be issued to the graphics processing core before a new memory index is received by the graphics processing core (in this embodiment this is a fixed number and is 3 tiles). The result of this calculation is then compared to a threshold number of tiles. If it is less than the threshold number of tiles, then the graphics processing core requests a new memory index (memory portion). In this embodiment the threshold is 1 tile.

In this embodiment, having processed several tiles, it is assumed by way of example that core 1 then determines that there is then less than the threshold amount of memory remaining in the memory portion which corresponds to memory index 1. The core 1 indicates this to the tile allocator 40 so as to prompt the tile allocator 40 to issue a new index to core 1 for storing subsequent results from subsequent tiles. In this embodiment, the graphics processing core 1 indicates that a new memory index is needed by setting a dedicated bit in the DONE response for the latest tile to be processed to '1'. Upon receiving this DONE response, the tile allocator 40 derives a new index for core 1. The new index for core 1 is 4, i.e. the current counter value. The graphics processing system then transitions to a wait state.

Figure 4:
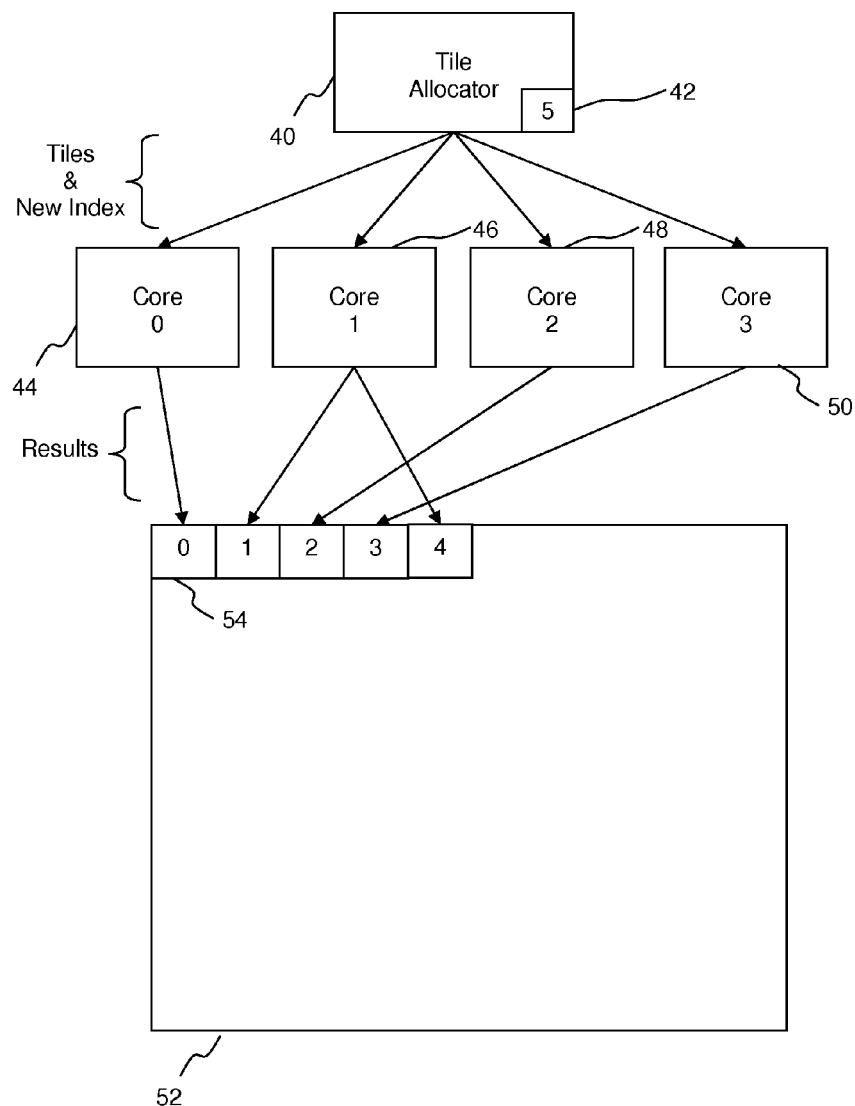
FIG. 4 shows a wait state for the graphics processing system of FIG. 2.

FIG. 4 shows the graphics processing system in the wait state. In this state, the tile allocator 40 issues the new index and a tile to core 1 in a RUN command. The tile allocator 40 also increments the counter 42 to 5. Core 1 continues to use the current index (i.e. "1") to store the results for previous tiles issued to it. Once the previous tiles have been processed and the corresponding results have been stored, core 1 then uses the new index (i.e. "4") to store a result for the tile which was issued with the new index. Once a DONE response is received for the tile which was issued with the new index, the graphics processing system transitions to a subsequent normal state.

Figure 5:
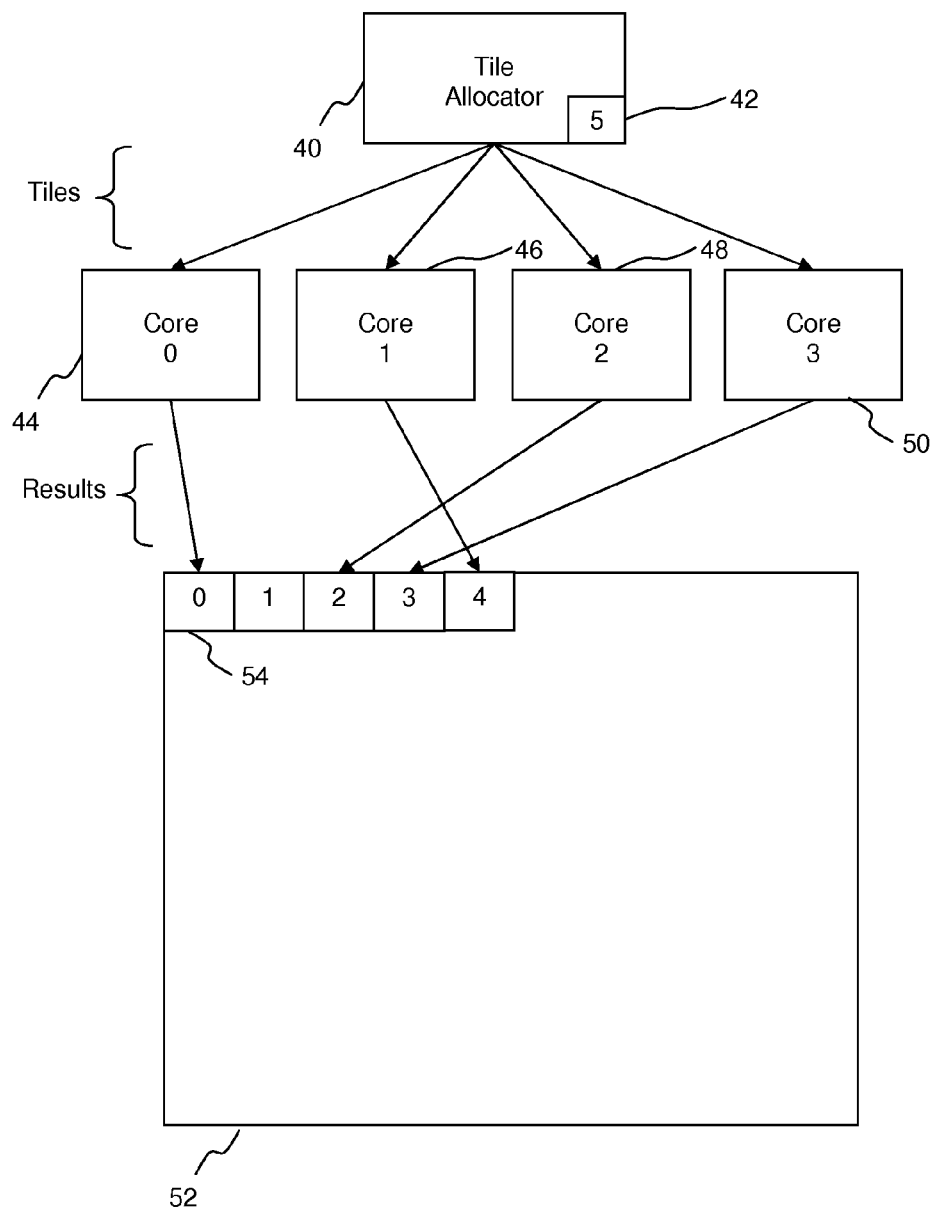
FIG. 5 shows a subsequent normal state for the graphics processing system of FIG. 2.

FIG. 5 shows the graphics processing system in the subsequent normal state. As is shown in FIG. 5, core 1 uses the new index (i.e. "4") to store its subsequent results for subsequent tiles. Each graphics processing core then continues to produce and store results using their indexes until one of the graphics processing cores 44, 46, 48, 50 again determines that there is less than the threshold amount of memory remaining in the memory portion which corresponds to the current index used by that graphics processing cores 44, 46, 48, 50. At this point the graphics processing core 44, 46, 48, 50 requiring more memory requests a new index, the tile allocator 40 derives a further new index based in the counter (i.e. the further new index "5"), and the graphics processing system transitions to a subsequent wait state and then to a further subsequent normal state similar to those which are shown in FIGS. 4 and 5.

As will be appreciated, the graphics processing system continues to operate in the above manner, issuing new memory indexes when needed, until all tiles are processed and their results are stored in the buffer 52. The compressed tile data in the buffer 52 may later be decompressed and used, for example, to generate a frame to be displayed, for use as an input for use by the graphics processing cores (e.g. as texture data), etc.

In the present embodiment, if the graphics processing job is suspended before completion, the current counter value is stored in memory as a restart value. When the graphics processing job is resumed, the graphics processing system is placed in a restart state similar to the initial state which is shown in FIG. 2, but with the counter 42 reset to the number of cores plus the restart value (i.e. 4 plus the restart value) and the graphics processing cores 44, 46, 48, 50 are each issued with indexes corresponding their core numbers plus the restart value (i.e. 0 plus the restart value, 1 plus the restart value, 2 plus the restart value, 3 plus the restart value). This allows a simple resetting of the graphics processing job to take place based on a single restart value, whilst preventing results which have already been produced from being overwritten.

Figure 6:
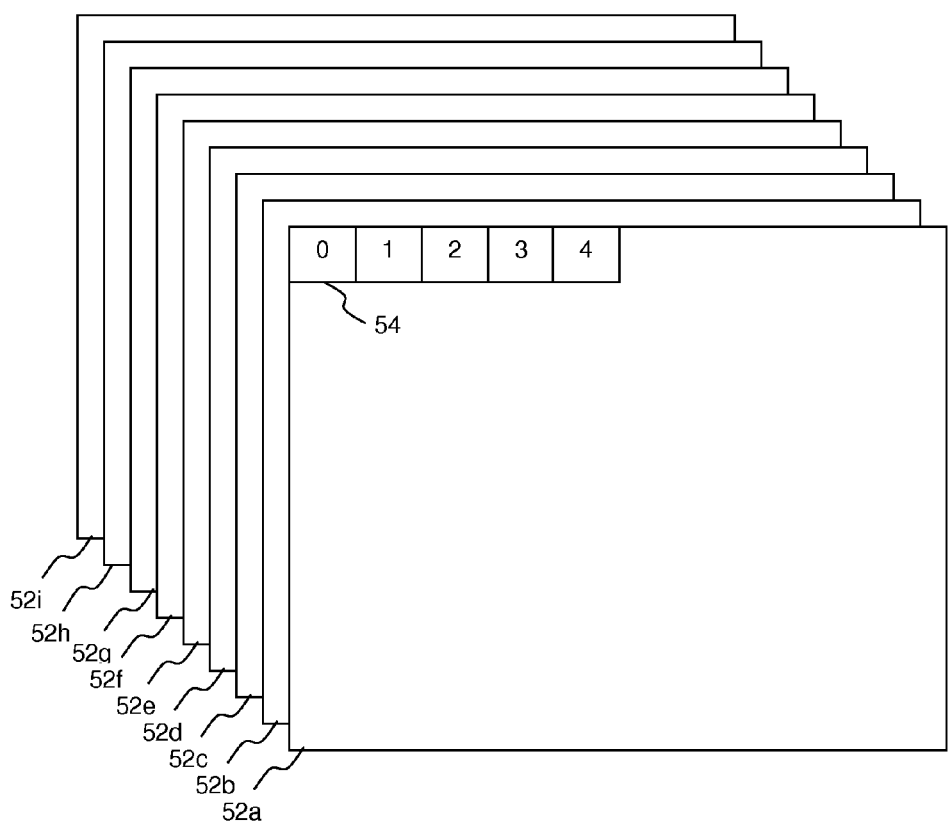
FIG. 6 shows a buffer arrangement for a graphics processing system that uses multiple render targets according to one embodiment of the technology described herein.

The above embodiments can be suitably adapted for use with plural output buffers or rendered targets. In one embodiment, there are 9 render targets. In this embodiment, the memory buffer comprises 9 memory allocations 52a-i as shown in FIG. 6.

A different offset is used by the graphics processing cores for each of the memory allocations 52a-i for the render targets. The tile allocator 40 also comprises a counter for each render target and provides an index for each graphics processing core 44, 46, 48, 50 for each render target. When issuing a tile for a given render target to a given core, the tile allocator 40 provides an appropriate index for that render target and core. In this embodiment, the RUN commands each comprise a 9 bit bitmap, with each bit of the 9 bit bitmap corresponding to a render target. The tile allocator 40 indicates which render target a new index is for by setting a corresponding bit of the 9 bit bitmap to 1. The graphics processing cores 44, 46, 48, 50 use the indexes and offsets for the render targets to store the results for the tiles in a similar manner to that which is discussed above for the single render target example.

Should a core determine that a new index is needed for a particular render target, then the core can indicate this to the tile allocator 40 in a DONE response. As with the RUN commands, the DONE responses each comprise a 9 bit bitmap, with each bit of the 9 bit bitmap corresponding to a render target. The core indicates that a new index is needed for a particular render target by setting a corresponding bit of the 9 bit bitmap to 1. The tile allocator 40 then derives a new index from the counter for the render target in question, and issues the new index to the graphics processing core which requested the new index in a subsequent RUN command issued to that core.

As will be appreciated, in a similar manner to the single render target example, the graphics processing system continues to operate in this way, issuing new memory indexes when needed, until all tiles for all render targets are processed and their results are stored in the buffer 52a-i. The compressed tile data in the buffer 52a-i is then written out to main memory 34. The compressed data may later be decompressed and used, for example, by the blender 29 or by the fragment shader 26 of the graphics processing pipeline 3 as texture data.

Again, in a similar manner to the single render target example, in the present embodiment, if the graphics processing job is suspended before completion, the largest current counter value is stored in memory as a restart value. When the graphics processing job is resumed, the graphics processing system is placed in a restart state similar to the initial state which is shown in FIG. 2, but with the counters for all the render targets reset to the number of cores plus the restart value (i.e. 4 plus the restart value) and the graphics processing cores 44, 46, 48, 50 each being issued with indexes counters for all the render targets corresponding their core numbers plus the restart value (i.e. 0 plus the restart value, 1 plus the restart value, 2 plus the restart value, 3 plus the restart value). It is appreciated that, since only the largest counter value is stored as a restart value, the present embodiment can lead to some data gaps in the buffer 52a-i for some render targets having counters which reached lower values. However, this is considered acceptable since, as discussed above, the method allows a simple resetting of the graphics processing system to take place based on a single stored restart value. Alternatively, the counter values for each of the render targets can be stored as respective individual restart values for the render targets when the graphics processing job is suspended. The respective restart values can then be used to derive respective restart indexes and restart counter values for each of the render targets when the graphics processing job is resumed.

As will be appreciated from the above, embodiments of the technology described herein at least can provide a system that can efficiently allocate memory to different processing cores in a tile-based computer graphics processing system. This is achieved in the embodiments of the technology described herein at least by graphics processing cores that request additional memory for storing the results produced by processing tiles, and a tile allocator that indicates a memory portion to be used by the graphics processing cores in response the requests made by the cores.

The foregoing detailed description has been presented for the purposes of illustration and description. It is not intended to be exhaustive or to limit the invention to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of allocating memory to processing cores in a multi-core processing system, the system comprising:
    plural processing cores for performing processing tasks, each processing core processing each task allocated to that processing core to produce a result for that task;
    a buffer comprising an allocated amount of memory for storing results that are produced by the plural processing cores; and
    a task allocator that allocates to the processing cores tasks to be processed, the task allocator indicating to the processing cores memory portions in the buffer for storing the results produced for the tasks;
    the method comprising:
    the task allocator allocating to each processing core of the plural processing cores a respective set of tasks to be processed by that processing core, the task allocator also indicating to each processing core of the plural processing cores a respective particular memory portion in the buffer for storing the results produced by that processing core for its set of tasks;
    the method further comprising each processing core of the plural processing cores, when processing a particular task of the set of tasks to be processed by that processing core:
        (i) processing the particular task to produce a particular result for the particular task;
        (ii) storing the particular result in the respective particular memory portion of the allocated memory of the buffer indicated to the processing core by the task allocator;
        (iii) determining whether there is less than a threshold amount of memory remaining in the respective particular memory portion indicated to the processing core by the task allocator; and
        (iv) if there is less than the threshold amount of memory remaining in the respective particular memory portion indicated to the processing core by the task allocator, requesting the task allocator to indicate a new memory portion to the processing core; and
    the method further comprising the task allocator, in response to a new memory portion being requested by a particular processing core of the plural processing cores:
        indicating a new memory portion to the particular processing core.

2. The method of claim 1, wherein the tasks performed by the processing cores comprise data compression tasks.

3. The method of claim 1, wherein the processing system comprises a graphics processing system, the processing cores comprise graphics processing cores, and the tasks performed by the processing cores comprise graphics processing tasks.

4. The method of claim 1, wherein indicating a new memory portion to the particular processing core comprises the task allocator providing a new memory index to the particular processing core, the new memory index being derived by the task allocator from a counter of the task allocator.

5. The method of claim 1, wherein storing the particular result in the respective particular memory portion comprises the processing core deriving the location of the respective particular memory portion from a memory index that is provided to the processing core by the task allocator.

6. The method of claim 5, wherein deriving the location of the particular memory portion comprises the processing core determining an address from the memory index, wherein determining the address comprises multiplying the memory index by a predetermined size for the memory portions and/or adding an offset.

7. The method of claim 1, wherein the processing of the tasks is performed in respect of plural output buffers or render targets, the task allocator maintaining a separate counter for deriving memory indexes for each of the plural output buffers or render targets.

8. The method of claim 1, wherein determining whether there is less than a threshold amount of memory remaining in the respective particular memory portion comprises the processing core determining whether the difference between the amount of unused memory in the respective particular memory portion and the amount of memory needed to store subsequent results for subsequent tasks is less than a threshold.

9. The method of claim 1, comprising suspending the processing of the tasks and storing a counter value of the task allocator as a restart value, and subsequently resuming the processing of the tasks on the basis of the restart value.

10. A multi-core processing system comprising:
    plural processing cores for performing processing tasks, each processing core processing each task allocated to that processing core to produce a result for that task;
    a buffer comprising an allocated amount of memory for storing results that are produced by the plural processing cores; and
    a task allocator that allocates to the processing cores tasks to be processed, the task allocator indicating to the processing cores memory portions in the buffer for storing the results produced for the tasks;
    wherein the task allocator is configured to allocate to each processing core of the plural processing cores a respective set of tasks to be processed by that processing core, the task allocator also being configured to indicate to each processing core of the plural processing cores a respective particular memory portion in the buffer for storing the results produced by that processing core for its set of tasks;
    wherein each processing core of the plural processing cores is configured to, when processing a particular task of the set of tasks to be processed by that processing core:
        (i) process the particular task to produce a particular result for the particular task;
        (ii) store the particular result in the respective particular memory portion of the allocated memory of the buffer indicated to the processing core by the task allocator;
        (iii) determine whether there is less than a threshold amount of memory remaining in the respective particular memory portion indicated to the processing core by the task allocator; and
        (iv) if there is less than the threshold amount of memory remaining in the respective particular memory portion indicated to the processing core by the task allocator, request the task allocator to indicate a new memory portion to the processing core; and
    wherein the task allocator is further configured to, in response to a new memory portion being requested by a particular processing core of the plural processing cores:
        indicate a new memory portion to the particular processing core.

11. The multi-core processing system of claim 10, wherein the tasks performed by the processing cores comprise data compression tasks.

12. The multi-core processing system of claim 10, wherein the processing system comprises a graphics processing system, the processing cores comprise graphics processing cores, and the tasks performed by the processing cores comprise graphics processing tasks.

13. The multi-core processing system of claim 10, wherein indicating a new memory portion to the particular processing core comprises the task allocator providing a new memory index to the particular processing core, the new memory index being derived by the task allocator from a counter of the task allocator.

14. The multi-core processing system of claim 10, wherein storing the particular result in the respective particular memory portion comprises the processing core deriving the location of the respective particular memory portion from a memory index that is provided to the processing core by the task allocator.

15. The multi-core processing system of claim 14, wherein deriving the location of the respective particular memory portion comprises the processing core determining an address from the memory index, wherein determining the address comprises multiplying the memory index by a predetermined size for the memory portions and/or adding an offset.

16. The multi-core processing system of claim 10, wherein the processing of the tasks is performed in respect of plural output buffers or render targets, the task allocator maintaining a separate counter for deriving memory indexes for each of the plural output buffers or render targets.

17. The multi-core processing system of claim 10, wherein determining whether there is less than a threshold amount of memory remaining in the respective particular memory portion comprises the processing core determining whether the difference between the amount of unused memory in the respective particular memory portion and the amount of memory needed to store subsequent results for subsequent tasks is less than a threshold.

18. The multi-core processing system of claim 10, comprising suspending the processing of the tasks and storing a counter value of the task allocator as a restart value, and subsequently resuming the processing of the tasks on the basis of the restart value.

19. A non-transitory computer readable storage medium storing computer software code which when executing on a processor performs a method of allocating memory to processing cores in a multi-core processing system, the system comprising:
  plural processing cores for performing processing tasks, each processing core processing each task allocated to that processing core to produce a result for that task;
  a buffer comprising an allocated amount of memory for storing results that are produced by the plural processing cores; and
  a task allocator that allocates to the processing cores tasks to be processed, the task allocator indicating to the processing cores memory portions in the buffer for storing the results produced for the tasks;
the method comprising:
  the task allocator allocating to each processing core of the plural processing cores a respective set of tasks to be processed by that processing core, the task allocator also indicating to each processing core of the plural processing cores a respective particular memory portion in the buffer for storing the results produced by that processing core for its set of tasks;
the method further comprising each processing core of the plural processing cores, when processing a particular task of the set of tasks to be processed by that processing core:
  (i) processing the particular task to produce a particular result for the particular task;
  (ii) storing the particular result in the respective particular memory portion of the allocated memory of the buffer indicated to the processing core by the task allocator;
  (iii) determining whether there is less than a threshold amount of memory remaining in the respective particular memory portion indicated to the processing core by the task allocator; and
  (iv) if there is less than the threshold amount of memory remaining in the respective particular memory portion indicated to the processing core by the task allocator, requesting the task allocator to indicate a new memory portion to the processing core; and
the method further comprising the task allocator, in response to a new memory portion being requested by a particular processing core of the plural processing cores:
indicating a new memory portion to the particular processing core.

* * * * *